United States Patent
Gaddala

(10) Patent No.: US 8,281,405 B1
(45) Date of Patent: Oct. 2, 2012

(54) SYSTEM, METHOD, AND COMPUTER PROGRAM PRODUCT FOR SECURING DATA ON A SERVER BASED ON A HEURISTIC ANALYSIS

(75) Inventor: Satish Kumar Gaddala, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 818 days.

(21) Appl. No.: 11/762,545

(22) Filed: Jun. 13, 2007

(51) Int. Cl.
*H04L 29/06* (2006.01)

(52) U.S. Cl. .......... 726/26

(58) Field of Classification Search .......... 726/26
See application file for complete search history.

(56) References Cited

U.S. PATENT DOCUMENTS

| | | | |
|---|---|---|---|
| 5,845,067 A | 12/1998 | Porter et al. | 395/186 |
| 7,206,964 B2 | 4/2007 | Moser et al. | 714/13 |
| 7,603,718 B2 * | 10/2009 | Rounthwaite et al. | 726/26 |
| 2002/0078202 A1 * | 6/2002 | Ando et al. | 709/225 |
| 2004/0008846 A1 * | 1/2004 | Medvinsky | 380/278 |
| 2005/0246778 A1 * | 11/2005 | Usov et al. | 726/28 |
| 2006/0179040 A1 * | 8/2006 | Bird et al. | 707/3 |
| 2006/0225134 A1 * | 10/2006 | Conti | 726/22 |
| 2007/0006322 A1 * | 1/2007 | Karimzadeh et al. | 726/27 |
| 2007/0011303 A1 | 1/2007 | Hatakeyama et al. | 709/224 |
| 2007/0061786 A1 * | 3/2007 | Zhou et al. | 717/136 |
| 2007/0094725 A1 * | 4/2007 | Borders | 726/22 |
| 2007/0150955 A1 * | 6/2007 | Murase et al. | 726/23 |
| 2007/0250920 A1 * | 10/2007 | Lindsay | 726/7 |
| 2008/0082538 A1 * | 4/2008 | Meijer et al. | 707/9 |

* cited by examiner

*Primary Examiner* — Michael S McNally
(74) *Attorney, Agent, or Firm* — Patent Capital Group

(57) ABSTRACT

A system, method, and computer program product are provided for securing data on a server based on a heuristic analysis. In use, information associated with attempts to access data on a server is recorded. Additionally, the information is heuristically analyzed. Further, the data is secured on the server based on the heuristic analysis.

21 Claims, 4 Drawing Sheets

SYSTEM, METHOD, AND COMPUTER PROGRAM PRODUCT FOR SECURING DATA ON A SERVER BASED ON A HEURISTIC ANALYSIS

FIELD OF THE INVENTION

The present invention relates to securing data, and more particularly to securing data on a server.

BACKGROUND

Traditionally, security systems have been provided for securing data. Oftentimes, such data security is provided for preventing, leakage of data (e.g. unwanted disclosure, sharing, etc. of data) outside of an organization. Recently, data leakage from within an organization has also been of concern.

For example, system administrators are generally granted full access to data within an associated administrated network, many times including confidential data directed toward specific users, like their mail data. As another example, access to a network user's data is sometimes secured using a unique user identifier that is particular to the user, such that unauthorized compromise of such identifier may result in full access to the user's potentially private and/or confidential data. There is thus a need for addressing these and/or other issues associated with the prior art.

SUMMARY

A system, method, and computer program product are provided for securing data on a server based on a heuristic analysis. In use, information associated with attempts to access data on a server is recorded. Additionally, the information is heuristically analyzed. Further, the data is secured on the server based on the heuristic analysis.

DETAILED DESCRIPTION

Figure 1:
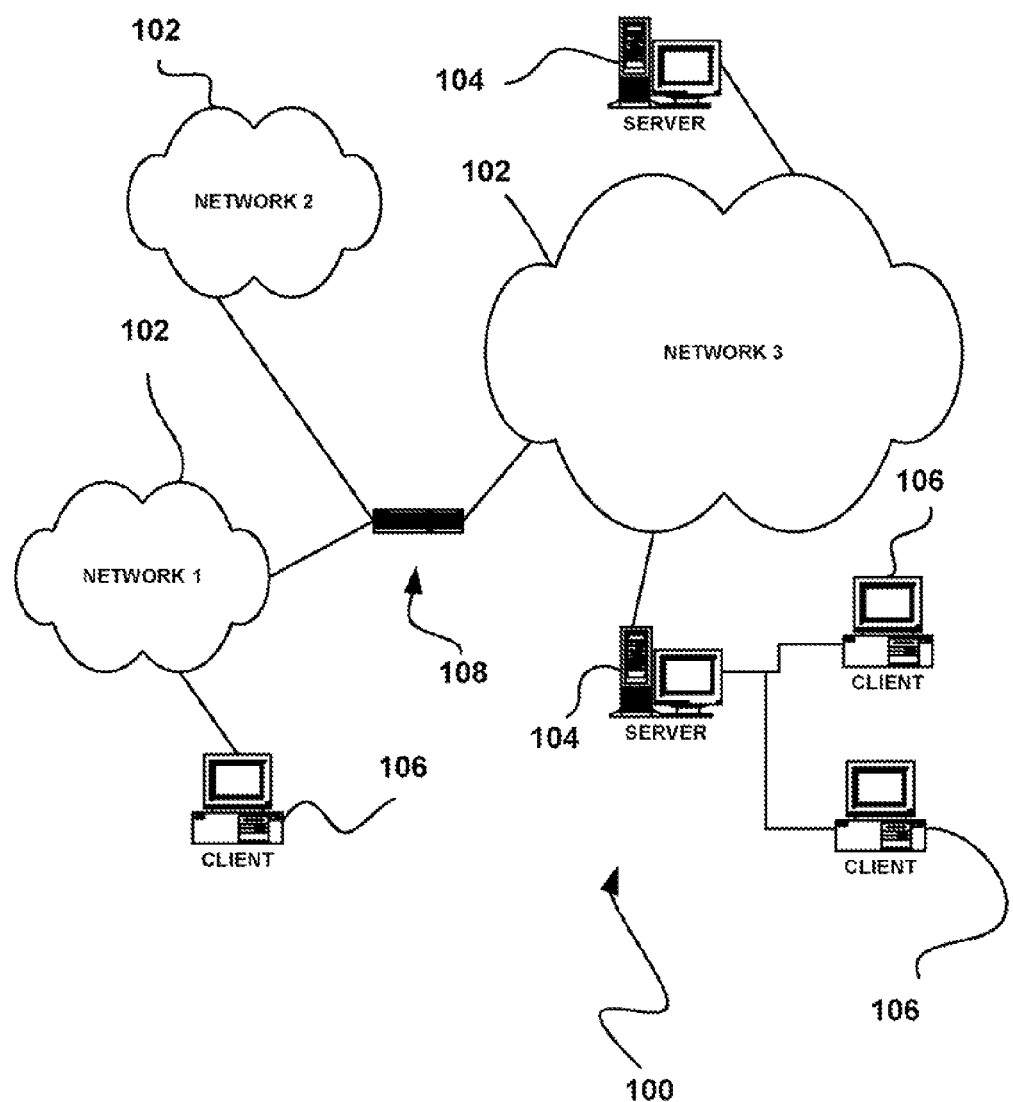
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
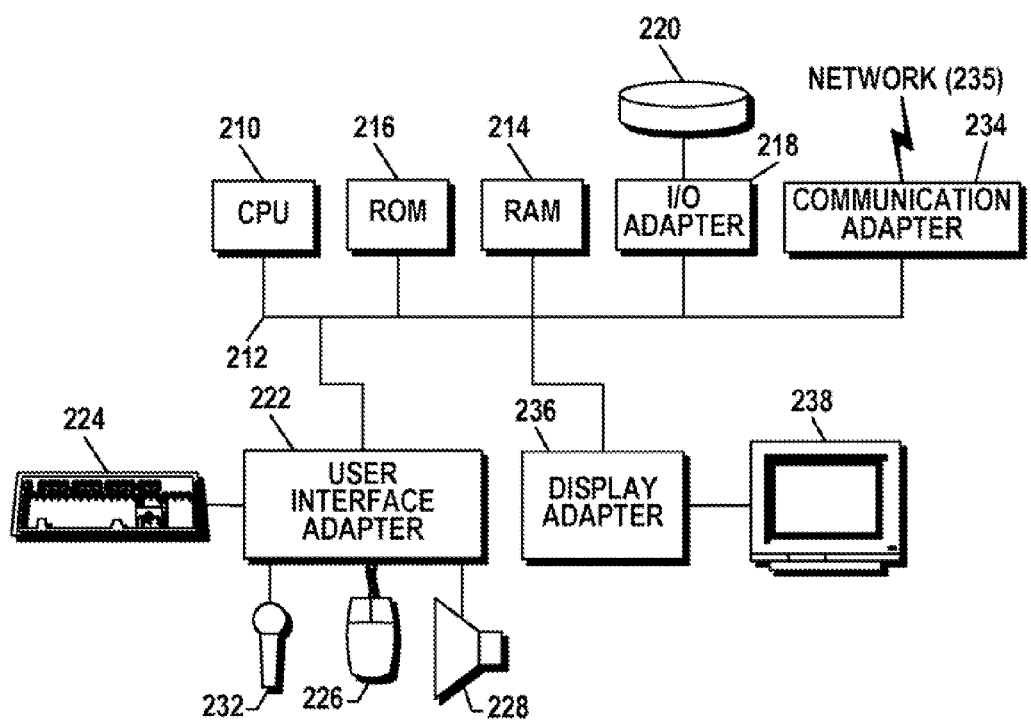
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not, shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along, with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
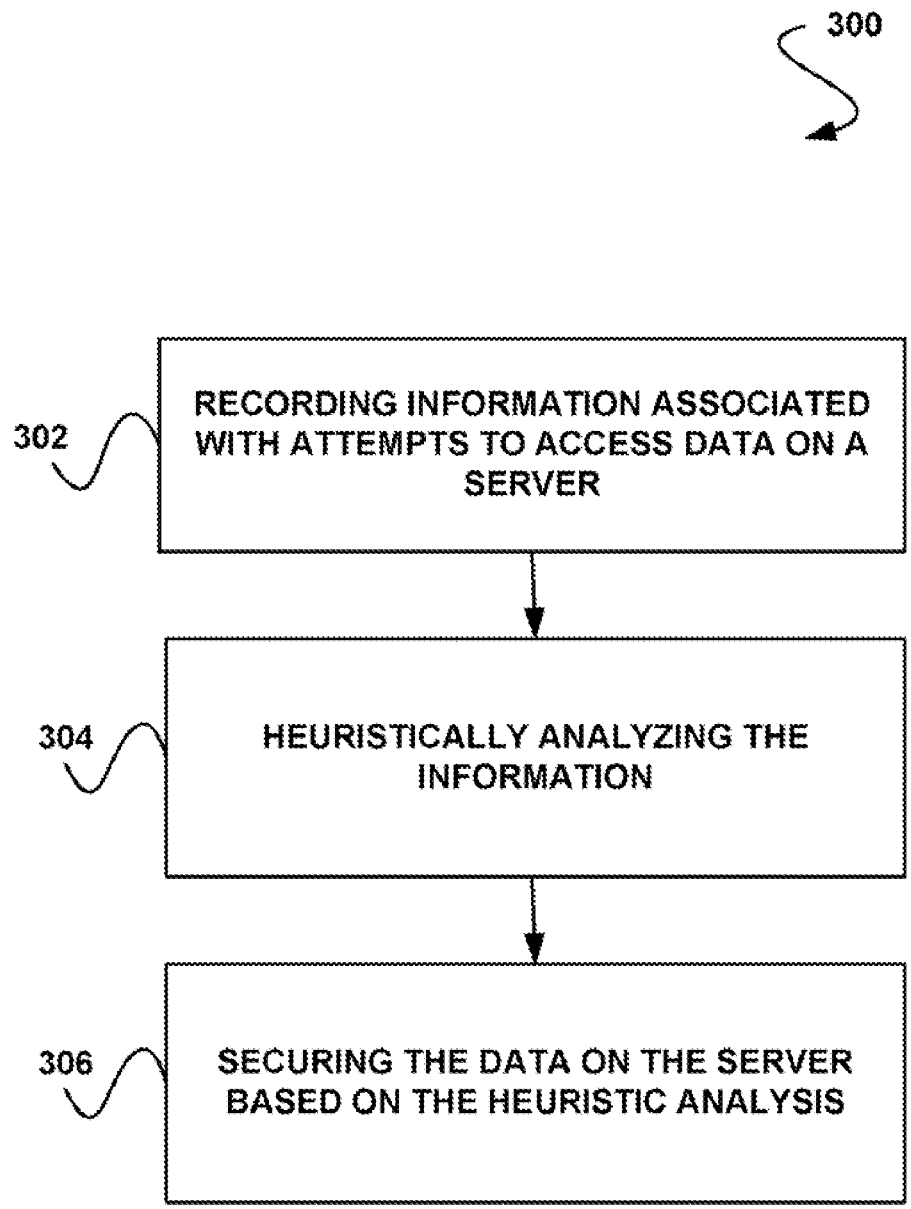
FIG. 3 shows a method for securing data on a server based on a heuristic analysis, in accordance with one embodiment.

FIG. 3 shows a method 300 for securing data on a server based on a heuristic analysis, in accordance with one embodiment. As an option, the method 300 may be carried out in the context of the architecture and environment of FIGS. 1 and/or 2. Of course, however, the method 300 may be carried out in any desired environment.

As shown in operation 302, information associated with attempts to access data on a server is recorded. In the context of the present description, the data may include any data capable of being stored on the server. For example, the data may include an electronic mail (email) message, an access control list (e.g. associated, with a database, computer program program, other data stored on the server, etc.), a file, a computer program, a database, etc.

Additionally, in one embodiment, the data may be particular to a user. For example, the data may be private with respect to the user (e.g. personal data, etc.), confidential with respect to the user, etc. To this end, the data may optionally only be accessible utilizing identification data (e.g. a unique identifier, etc.) associated with the user. As another option, the identification data (e.g. a user id file, etc.) may be created during registration of the user in connection with the server.

Just by way of example, the identification data may include an identification file unique to the user. Such identification file may include, in one embodiment, a private key, such that the private key may be associated with a public key for accessing the data particular to the user. In addition, the identification file may be stored on a client (e.g. personal computer, handheld device, any of the devices described above with respect to FIGS. 1 and/or 2, etc.) utilized by the user, such that, in response to a request issued by the user utilizing the client to access the data, the client may be verified based on the identification file stored thereon.

Furthermore, the server on which the data is located may include any device capable of storing data. For example, the server may include any of the devices described above with respect to FIGS. 1 and/or 2. In one embodiment, the server may include a particular type of server (e.g. application server, web server, database server, etc.) capable of providing a custom application platform at an enterprise level. Optionally, the server ma optionally provide email messaging functionality and/or any other desired applications for devices associated with an enterprise. Just by way of example, the server may be a IBM® Lotus® Domino® server, in one possible embodiment.

Still yet, the attempts to access the data on the server may include any requests made with respect to the data, which may, but do not necessarily result in actual access to the data. For example, the attempts to access the data may include requests to open, read, write, modify, etc. the data on the server. Optionally, the attempts to access the data may also include an attempt to log on to the server. In one embodiment, the attempts to access the data on the server may be issued remotely. For example, the attempts may be issued by a client to the server over a network (e.g. such as any of the networks described above with respect to FIG. 1).

Additionally, the attempts to access the data may be issued automatically. For example, the attempts may be issued by an application. As another option, the attempts to access the data may be issued manually. Such manual attempts may include, for example, user-initiated attempts.

Moreover, in one embodiment, the attempts to access the data may include an attempt to modify an access control list (ACL) initially. The ACL may include, for example, a list of permissions associated with content (e.g. files, email messages, computer programs, etc) located local and/or remote with respect to the server on which the data is stored. Such permissions may include user permissions, which indicate access rights to content based on particular users. As another option, the permissions may include application and/or device permissions, which may indicate access rights to content based on particular applications (e.g. computer programs, etc.) and/or devices (e.g. computers, etc.), respectively. Also modifying the ACL may optionally include modifying any of the permissions in the ACL.

In another embodiment, the attempts to access the data may include an attempt by a first user to access data at least previously inaccessible to such first user (e.g. due to the fact that it was particular to a second user, etc.). For example, identification data. previously utilized by the second user to access the data may be utilized by the first user to access the data. In this way, the first user may attempt to access data particular to the second user utilizing such identification data associated with the second user.

As another example, the identification data may have previously been stored on a second computer utilized by the second user to access the data, and may thus be subsequently stored on a first computer utilized by the first user to access the data. Accordingly, the attempts to access the data may include attempts to access data utilizing identification data that has changed locations.

In yet another embodiment, the attempts to access the data may include an attempt by a first user and an attempt by a second user to access the same data simultaneously. For example, the second user may attempt to access data during access of such data by the first user. Of course, it should be noted that such access attempts are only examples of various attempts to access the data that may be made, and that the attempts to access the data may be performed in any desired manner.

With reference still to operation 302 of FIG. 3, the information associated with the attempts to access the data may include any information capable of describing, or being otherwise associated with such attempts. In one embodiment, the information may include a source of the attempts. For example, such source may identify a computer [e.g. by computer name, internet protocol (IP) address, etc.], a user, etc which initiated the attempts.

In another embodiment, the information may include a time associated with each of the attempts. In still yet another embodiment, the information may describe the type of attempts (e.g. open data read data, modify data etc.). Just by way of example, the information may describe an attempt to modify the data, in even still yet another embodiment, the information may indicate identification data utilized in attempting to access the data.

Also, the information may be recorded in any desired data structure capable of storing the same. For example, the information may be recorded in a log file. In one embodiment, the log file may be of any desired size. Optionally, a number of entries of information stored in the log file may be predetermined (e.g. user configured, etc.). In another embodiment, such data structure may be stored on the server on which the data attempted to be accessed is located. To this end, information associated with attempts to access data on a server is recorded.

As shown in operation 304, such information is heuristically analyzed. In the context of the present description, such analysis may include any heuristic analysis which utilizes recorded information associated with a plurality of attempts to access the data. Just by way of example, recorded information associated with a latest attempt to access the data may be analyzed with respect to recorded information associated with previous attempts to access the data. In this way, in some embodiments, characteristics, patterns, etc. may be identified from recorded information associated with a plurality of attempts to access the data, utilizing the heuristics analysis.

In one embodiment, the heuristic analysis may include determining whether the information is suspicious. For example, a determination that the information is suspicious may indicate that the attempts to access the data are suspicious. Moreover, determining that the information is suspicious may optionally indicate that the data attempted to be accessed (for which the information was recorded) is at least potentially associated with data leakage. Such data leakage may include any unwanted and/or unauthorized disclosure, sharing, discovery, etc. of the data.

For example, the characteristics, patterns, etc. identified from the information may indicate whether the information is suspicious. As an option, such characteristics, patterns, etc. may be compared with thresholds for determining whether the information is suspicious. Just by way of example, it may be determined that the information is suspicious if the information indicates that access to the data has been attempted a threshold number of times. Such threshold may include any predefined (e.g. user defined, automatically defined, etc.) threshold.

As an option, the information may be heuristically analyzed utilizing the server. For example, an application executing on the server may be utilized for heuristically analyzing the information. As another option, the information may be heuristically analyzed remotely from the server.

Still yet, the data is secured on the server based on the heuristic analysis, as shown in operation 306. In one embodiment, the data may be secured on the server if it is determined that the information is suspicious, based on the heuristics analysis. Thus, the data may be secured if at least potential data leakage is possible, based on the heuristic analysis.

Just by way of example, an ACL may be secured if a predetermined number of modifications to an ACL, or a specific portion thereof, have been made via the attempts to access such ACL. As another example, a database previously only accessed utilizing identification data stored on a first computer associated with a first user may be secured, if the database is subsequently accessed utilizing the same identification information which is stored on a second different computer associated with a second different user. In yet another example, data being accessed by a first user may be secured with respect to access by a second user during such access by the first user.

Additionally, in one embodiment, the data may be secured by preventing access to the data, such that access may be prevented for a predefined (e.g. user defined, etc.) time period, until an administrator enables access, etc. In another embodiment, the data may be secured by notifying an administrator or a user e.g. to which the data is particular), etc. Of course, however, the data may be secured in any desired manner.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
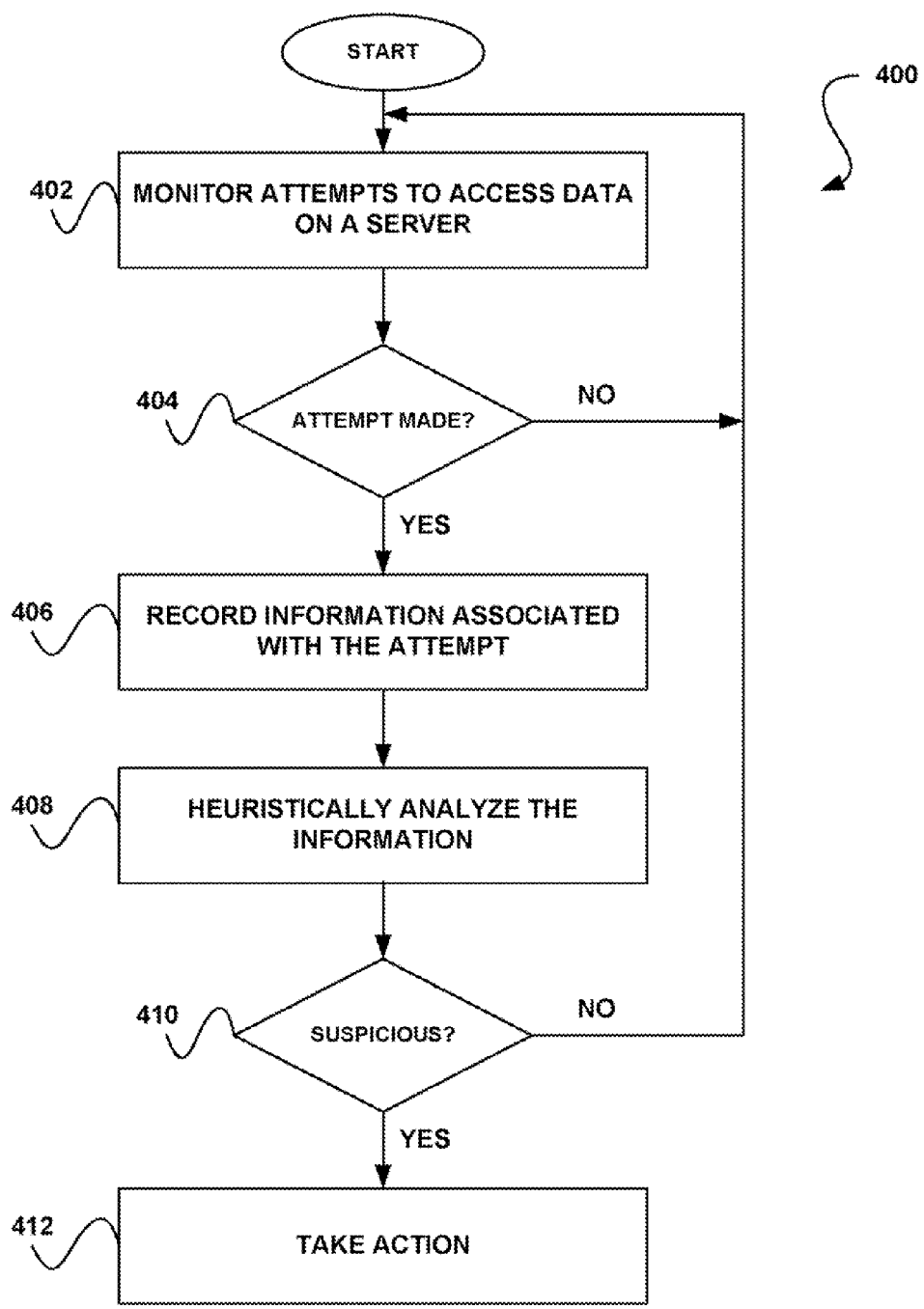
FIG. 4 shows a method for taking action is response to a determination that information associated with an attempt to access data on a server is suspicious, in accordance with another embodiment.

FIG. 4 shows a method 400 for taking action is response to a determination that information associated with an attempt to access data on a server is suspicious, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, attempts to access data on a server are monitored. In one embodiment, such monitoring may be performed utilizing an application on the server. Of course, however, the monitoring may be performed remotely from the server, utilizing, for example, a computer or network device that intercepts attempts to access data directed from clients and/or other servers to the server on which the data is located.

In addition, it is determined whether an attempt to access the data on the server has been made. Note decision 404. In response to a determination that an access attempt has been made, information associated with the attempt is recorded, as shown in operation 406. Just by way of example, such information may include an identification of a source of the attempt, a time of the attempt, a description of the access type attempted, etc.

Optionally, the information may be recorded in a log file to which information associated with other attempts to access the data has been recorded. In this way, the log file may include information associated with a plurality of attempts to access the data. Also, the log file may include information associated with attempts to access other data on the server.

As another option, the log file may be configured (e.g. user-configured, etc.). For example, the information that is recorded in the log file may be selected based on the configuration. To this end, only desired information associated with the attempt to access the data may be recorded.

Table 1 illustrates one example of a log file in which information associated with attempts to access data on a server may be recorded. It should be noted that such log file is set forth for exemplary purposes only, and thus should not be construed as limiting in any manner.

TABLE 1

| DATA | SOURCE | TIME | DESCRIPTION |
|---|---|---|---|
| ACL_02 | Computer_01 | 02:45:00 | Attempt to Add permission for User_01 to access File_05 |
| User 5 mail Database | Computer_05 | 02:40:00 | Simultaneous session opened from Computer_04 |
| ACL_02 | Computer_01 | 02:39:00 | Add permission for User_01 to access File_04 |
| File_01 | Computer_03 | 02:37:00 | Read File_01 |
| ACL_02 | Computer_02 | 02:34:00 | Delete permission for User_02 to access File_01 |

As shown in Table 1, each entry in the log file may indicate the particular data attempted to be accessed, in addition, with respect to each entry, an identifier of a computer that initiated the attempt may be recorded, along with a time of the attempt. The description of each log file entry may indicate the type of access attempted, as also shown. While not shown, it should be noted that a flag, or any other desired indicator, may be associated with each entry in the log file for indicating whether access to the data associated with the attempt was prevented, allowed, successful, etc., and optionally any actions taken in response thereto (e.g. notifications, etc.).

Furthermore, as shown in operation 408, the information associated with the attempt to access the data is heuristically analyzed. For example, the heuristic analysis may include an analysis of the information with respect to any other information in the log file associated with another (e.g. previous) attempt to access the data. In this way, characteristics, patterns, etc. associated with attempts to access the data may be identified utilizing the heuristic analysis.

Additionally, it is determined whether the information is suspicious, based on the heuristic analysis. Note decision 410. Such determination may be made based on predefined thresholds compared to results of the heuristic, analysis, just by way of example. Still yet, a determination that the information is suspicious may indicate that the attempt to access the data is suspicious, that the data is at least potentially being subjected to data leakage, etc.

If it is determined that the information is not suspicious, further attempts to access data on the server are monitored (operation 402). Of course, however, attempts to access data on the server, as in operation 402, may be continuously monitored. In this way, attempts to access data on the server may be monitored during a heuristic analysis of any identified attempts.

If however, it is determined that the information is suspicious, action is taken, as shown in operation 412. As an option, the action taken may be based on the type of access attempted. For example, if the access includes reading the data or opening the data, the action may include communicating a notification e.g. alert, etc.) to an administrator, user, etc. In another example, if the access includes modifying the data, transmitting the data, deleting the data, etc., the action may include preventing the access or the attempted use/manipulation of the data.

As another option, the action taken may be based on the data attempted to be accessed. In this way, particular types of data may each be associated with different actions e.g. based on user definitions, etc.). For example, if the access is associated with an ACL, the action may include preventing the access. As another example, if the access is associated with an email message, the action may include communicating a notification.

As yet another option, the action taken may be based on the characteristics, patterns, etc. identified by the heuristic analysis, in one embodiment, if the heuristic analysis determines that a predetermined number of modifications have been attempted to modify an ACL (e.g. within a predefined time period, etc.), the action may include preventing an access to the ACL. In another embodiment, if the heuristic analysis determines that identification data utilized in the attempt to access the data has previously been utilized by a different user, the action may include communicating a notification to the different user, an administrator, etc.

Of course, it should be noted that the action taken may be selected in any desired manner. Further, the action may include any desired action capable of being taken in response to a determination that the information is suspicious. To this end, data leakage may be prevented by taking action when information associated with an attempt to access the data is determined to be suspicious.

in one exemplary embodiment, an attempt to modify an ACL is identified. The modification may include changing permissions designated by the ACL, for example. In response to identification of the attempt, information associated with such attempt is recorded. As an option, the information may include a source (e.g. computer, user, etc.) that initiated the attempt.

The recorded information is further heuristically analyzed. For example, the recorded information may be analyzed in view of other recorded information associated with other attempts to modify the ACL. Accordingly, a pattern of attempts to modify the ACL (e.g. by a particular computer, within a predetermined time period, etc.) may be identified. In response to an indication that the information is suspicious (based on the heuristic analysis), an action may be taken to prevent the attempted modification to the ACL. In this way, in response to a determination that information associated with an attempt to modify an ACL is suspicious, such access may be prevented.

In another exemplary embodiment, an attempt to log on to a server utilizing identification data is identified. In response, information associated with the attempt is recorded. Such information may identify a source of the attempt, the identification data, etc.

Further, the information is heuristically analyzed. Such heuristic analysis may include identifying previously recorded information associated with the identification data. In addition, the heuristic analysis may include determining whether the identification data was associated with different sources, based on the identification of the previously recorded information. For example, information indicating that different sources utilized the identification data may signify that the information associated with the attempt to log on to the server is suspicious. Optionally, such signification may be based on whether the identification data was used intermittently between a pair of, or more, different sources.

In this way, the heuristic analysis may be utilized for identifying at least potential data leakage by way of possible unauthorized use of identification data. In response to such situation, use of the identification data may be prevented (e.g. for all sources, for sources that do not include a source to which the identification data is registered, etc.). As other option, in response to the identification of potential data leakage, a notification may be communicated to a user, computer, etc. registered to the identification data.

In yet another exemplary embodiment, an attempt to access data on a server identification data is identified. In response, information associated with the attempt is recorded. For example, such information may include a source of the attempt, the identification data utilized, etc. Thus, the information may indicate a location of the identification data, based on the identified source.

Similar to the other example of use, the recorded information is also heuristically analyzed. Such heuristic analysis may include determining previously stored information associated with the identification data. In this way, any other sources that utilized the identification data to access data on the server previous to the identified attempt may be identified. Additionally, the heuristic analysis may include determining whether any of such sources are different than the source associated with the identified attempt.

Identification of any differences may optionally indicate that the information is suspicious. For example, differences in sources utilizing the same identification data may indicate unauthorized use of the identification data by sources (e.g. via theft of such identification data etc.) for illegitimately accessing data such as potentially confidential data, associated therewith. Of course, this may not be deemed unauthorized use all of the time, as some users access the data from two or more different locations. Accordingly, the attempt to access the data may be prevented for avoiding potential leakage of the data. To this end, in situations where identification data, such as an identification file uniquely registered to a user, is compromised, access to data utilizing the identification data may be prevented.

In still yet another exemplary embodiment, an attempt to access data is identified. In response, information associated with the attempt is recorded. In the context of the present exemplary embodiment, such information may include a source of the attempt.

Moreover, the stored information is heuristically analyzed. Such heuristic analysis may include determining whether any previously recorded information is associated with an access attempt with respect to the data. Optionally, only information recorded within a predetermined amount of time previous to the identified attempt may be identified. As another option, only information which indicates that the data is still being accessed based on a previous attempt may be identified.

In this way, it may be determined whether the data associated with the access attempt is currently being accessed by another source. In response to such a scenario, the identified attempt to access the data may be prevented. In this way, access to the same data by different sources simultaneously may be prevented. As another option, access to such data may be allowed simultaneously, but notifications may be communicated to such sources.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    recording information associated with attempts to access data on a server, wherein the attempts are provided remotely over a network to which the server is coupled;

heuristically analyzing the information associated with the attempts in order to identify a pattern associated with data leakage; and securing the data on the server for a predefined period of time based on the pattern, wherein an action to secure the data is determined based on a type of access attempted, such that different actions are associated with different types of access attempts, and wherein at least one of the different actions includes securing an access control list (ACL) based on a number of modifications to the ACL, and wherein the data is accessible using an identification file that comprises a private key that can be associated with a public key for accessing the data on the server.

2. The method of claim 1, wherein the data includes an electronic mail message.

3. The method of claim 1, wherein the data is particular to a user.

4. The method of claim 1, wherein the data includes an access control list.

5. The method of claim 1, wherein the at least one source identifies at least one computer.

6. The method of claim 1, wherein the information describes an attempt to modify the data.

7. The method of claim 1, wherein the modifications of the access control list include modifying permissions in the access control list.

8. The method of claim 1, wherein the attempts to access the data include a first user attempting to access data particular to a second user.

9. The method of claim 8, wherein the first user attempts to access data particular to the second user utilizing identification data associated with the second user.

10. The method of claim 9, wherein the identification data includes the identification file.

11. The method of claim 1, wherein the attempts to access the data include an attempt by a first user and an attempt by a second user to access the same data simultaneously.

12. The method of claim 1, wherein heuristically analyzing the information includes determining whether the information is suspicious.

13. The method of claim 12, wherein the information is suspicious if the information indicates that access to the data has been attempted a threshold number of times.

14. The method of claim 12, wherein the data is secured on the server if it is determined that the information is suspicious.

15. The method of claim 1, wherein securing the data includes preventing access to the data and sending notifications.

16. The method of claim 1, wherein heuristically analyzing the data includes determining that a database previously only accessed utilizing identification data stored on a first computer associated with a first user is subsequently accessed utilizing the identification data as stored on a second computer associated with a second user, and securing the data based on the heuristic analysis includes securing the database in response to the determination.

17. The method of claim 1, wherein the action includes communicating an alert if the type of the access attempted includes at least one of reading the data and opening the data, and wherein the action includes preventing the access attempted if the type of the access attempted includes at least one of modifying the data, transmitting the data, and deleting the data.

18. The method of claim 1, wherein the type of access includes at least one of reading the data, opening the data, modifying the data, transmitting the data, deleting the data, simultaneous access to the data, access by a first user using identification of a second user, a predetermined number of modifications to the data, and modifications to a specific portion of the data.

19. A computer program product embodied on a non-transitory computer readable medium for:

recording information associated with attempts to access data on a server, wherein the attempts are provided remotely over a network to which the server is coupled;

heuristically analyzing the information associated with the attempts in order to identify a pattern associated with data leakage; and securing the data on the server for a predefined period of time based on the pattern, wherein an action to secure the data is determined based on a type of access attempted, such that different actions are associated with different types of access attempts, and wherein at least one of the different actions includes securing an access control list (ACL) based on a number of modifications to the ACL, and wherein the data is accessible using an identification file that comprises a private key that can be associated with a public key for accessing the data on the server.

20. A system, comprising:

a processor, wherein the system is configured for:

recording information associated with attempts to access data on a server, heuristically analyze the information associated with the attempts in order to identify a pattern associated with data leakage;

securing the data on the server for a predefined period of time based on the pattern, wherein an action to secure the data is determined based on a type of access attempted, such that different actions are associated with different types of access attempts, and wherein at least one of the different actions includes securing an access control list (ACL) based on a number of modifications to the ACL, and wherein the data is accessible using an identification file that comprises a private key that can be associated with a public key for accessing the data on the server.

21. The system of claim 20, further comprising memory coupled to the processor via a bus.

* * * * *